(12) United States Patent
Englund et al.

(10) Patent No.: US 11,254,416 B2
(45) Date of Patent: Feb. 22, 2022

(54) METHOD AND APPARATUS FOR REMOTE ANGLE CALIBRATION AND MEASUREMENT

(71) Applicant: The Boeing Company, Chicago, IL (US)

(72) Inventors: Norman Englund, Seattle, WA (US); Christopher Yeeles, Renton, WA (US); Kim Ng, Renton, WA (US); James Fortier, Renton, WA (US); Paul Rugland, Seattle, WA (US)

(73) Assignee: THE BOEING COMPANY, Chicago, IL (US)

(*) Notice: Subject to any disclaimer, the term of this patent is extended or adjusted under 35 U.S.C. 154(b) by 460 days.

(21) Appl. No.: 16/414,128

(22) Filed: May 16, 2019

(65) Prior Publication Data

US 2020/0361592 A1    Nov. 19, 2020

(51) Int. Cl.
| | |
|---|---|
| *B64C 9/12* | (2006.01) |
| *B64C 9/34* | (2006.01) |
| *G06F 17/11* | (2006.01) |
| *B64D 45/00* | (2006.01) |
| *B64C 9/00* | (2006.01) |

(52) U.S. Cl.
CPC .............. *B64C 9/12* (2013.01); *B64C 9/34* (2013.01); *B64D 45/0005* (2013.01); *G06F 17/11* (2013.01); *B64C 2009/005* (2013.01)

(58) Field of Classification Search
CPC ....... B64C 9/12; B64C 9/34; B64C 2009/005; B64C 25/26; B64C 9/00; B64C 9/16; G06F 17/11; B64D 45/0005; B64F 5/60
See application file for complete search history.

(56) References Cited

U.S. PATENT DOCUMENTS

| | | | | |
|---|---|---|---|---|
| 2,520,934 | A | | 9/1950 | Hoy |
| 3,015,457 | A | * | 1/1962 | Dixson ............... G05D 1/0202 244/3.16 |
| 3,181,812 | A | * | 5/1965 | Dixson ............... G01C 21/165 244/3.18 |
| 3,313,152 | A | * | 4/1967 | Kulda ................. G05D 1/0661 73/178 T |
| 3,478,569 | A | | 11/1969 | Aichinger |
| 8,203,702 | B1 | * | 6/2012 | Kane .................... G01J 3/0289 356/139.05 |
| 9,290,268 | B2 | * | 3/2016 | Ratti .................... B64C 33/025 |
| 2014/0306067 | A1 | * | 10/2014 | Guida .................. B64C 23/076 244/199.4 |

(Continued)

FOREIGN PATENT DOCUMENTS

| | | | | |
|---|---|---|---|---|
| CN | 106840604 B | * | 3/2019 | ............ G01M 11/00 |
| DE | 150333 A3 | * | 8/1981 | |

(Continued)

*Primary Examiner* — Behrang Badii
*Assistant Examiner* — Jalal C Coduroglu
(74) *Attorney, Agent, or Firm* — Coats & Bennett, PLLC (57) ABSTRACT

Methods and devices to measure an angular deflection of an aircraft member. The devices are configured to be attached to the aircraft member. The devices are configured to obtain an orientation of the device about three separate axes. The methods use initial orientation values and dynamic orientation values to calculate an axis of rotation. Using the axis of rotation, the deflection angle can be calculated for the aircraft member.

20 Claims, 5 Drawing Sheets

(56) References Cited

U.S. PATENT DOCUMENTS

2016/0202131 A1* 7/2016 Roy .................. G01L 1/086
  73/650
2021/0261235 A1* 8/2021 Miralles .................. B64C 11/00

FOREIGN PATENT DOCUMENTS

DE 102019105059 A1 * 6/2020 ............... G01B 5/28
EP 2682341 B1 11/2014

* cited by examiner

METHOD AND APPARATUS FOR REMOTE ANGLE CALIBRATION AND MEASUREMENT

TECHNOLOGICAL FIELD

The present disclosure relates generally to the field of remote sensing and, more specifically, to a device and method for calculating the angular movement of a member.

BACKGROUND

Aircraft include a number of members that are movable relative to the body of the aircraft. One example of an aircraft member is a flight control member such as an elevator on the rear of the aircraft that controls the pitch of the aircraft. Another example includes simple hinged flaps that are mounted on the wing trailing edges and used to increase the lift of the aircraft at a given airspeed, and flaps and vertical hinges that measure the nose gear angle. Input controls in the cockpit are used by the pilots to enter control commands that adjust the angular position of the aircraft members to control the aircraft.

The system should be tested to ensure that the actual movement of the aircraft member is consistent with the control commands entered through the input controls. This can include attaching a device to the aircraft member that measures the movement while a technician in the cockpit enters control commands. One current system uses linkages that are fastened to the flight control surfaces, and angle sensors that detect the relative position of the linkages. The setup has inherent errors in alignment of the linkages relative to the flight control surface. The linkages can also include a large mass making it difficult to accurately attach to the flight control surface. Current systems also use pendulous accelerometers to sense angle change based on gravity vector.

Testing of the system can also be performed manually. However, this requires a mechanic to be at or near the moving aircraft member during the testing to measure the movement. The moving aircraft member can pose a safety issue as the technician entering the control commands in the cockpit may not be able to determine the location of technicians at the aircraft member. The testing requires careful planning to ensure that that the technician is safely away from the moving aircraft member.

SUMMARY

One aspect is directed to a method of measuring an angular deflection of an aircraft member that has a single pivot axis. The method includes: obtaining an initial value for each of a first axis, a second axis, and a third axis of a multi-axis angle measurement device while the multi-axis angle measurement device is attached to the aircraft member; obtaining a dynamic value for each of the axes for each of a plurality of time instants while the multi-axis angle measurement device is attached to the aircraft member and the aircraft member is moving about the single pivot axis; calculating a compensated dynamic value for each of the axes for each of the plurality of time instants using the initial values; calculating an average compensated dynamic value for each of the three axes; identifying a maximum axis as one of the first, second, and third axes having a largest absolute value of the average compensated dynamic value; calculating a transformation from the first, second, and third axes of the multi-axis angle measurement device to the aircraft member pivot axis; calculating a rate about the axis of rotation for each of the plurality of time instants using the corresponding compensated dynamic values; and integrating the rates about the pivot axis over the plurality of time instants to calculate an angle of deflection of the aircraft member.

In another aspect, calculating compensated dynamic values for each of the axes includes subtracting, for each of the plurality of time instants, the corresponding static values from each of the dynamic values.

In another aspect, the method includes obtaining an initial values for each of the first axis, the second axis, and the third axis occurs while the aircraft member is stationary.

In another aspect, the method includes wirelessly transmitting calculations to a remote source.

In another aspect, the method includes receiving an initial starting angle of the aircraft member and calculating an absolute angular position of the aircraft member.

In another aspect, the method includes aligning the aircraft member at a known angle relative to a support body to which the aircraft member is attached prior to obtaining the initial values and the dynamic values.

In another aspect, the method includes that the aircraft member is a flight control member and aligning the flight control member relative to an index plate that is attached to a fuselage prior to obtaining the initial values and the dynamic values.

One aspect is directed to a method of measuring an angular deflection of a surface of an aircraft member that has a single pivot axis. The method includes: obtaining an initial value for each axis of a gyro sensor having three axes while the gyro sensor is attached to the surface of the aircraft member; obtaining dynamic values for each axis of the gyro sensor at a plurality of time instants while the gyro sensor is attached to the aircraft member and the aircraft member is pivoting about the single pivot axis; calculating compensated dynamic values at each of the plurality of time instants for each of the three axes using the initial values; calculating an axis of rotation of the gyro sensor responsive to the compensated dynamic values; and calculating a total deflection angle of the surface of the aircraft member over the plurality of instants responsive to the compensated dynamic values and the axis of rotation.

In another aspect, calculating the compensated dynamic values at the plurality of time instants for each of the three axes includes subtracting the corresponding static value from each of the corresponding dynamic values at each of the plurality of instants.

In another aspect, calculating the axis of rotation includes: calculating, for each of the three axes, an average dynamic value for the plurality of time instants; identifying a maximum axis as the axis having a largest absolute value of the average dynamic value; and calculating the axis of rotation of the gyro sensor responsive to the compensated dynamic values and the maximum axis.

In another aspect, calculating the total deflection angle includes: calculating a rate about the axis of rotation for each of the plurality of time instants using the corresponding compensated dynamic values; and integrating the rates about the axis of rotation over the plurality of time instant to calculate the total deflection angle.

In another aspect, the method includes obtaining the initial value for each axis of the gyro sensor while the aircraft member is stationary.

In another aspect, the method includes receiving a starting angle of the surface of the aircraft member and calculating an absolute angle of the surface of the aircraft member.

In another aspect, the method includes aligning the aircraft member at a known angle relative to a support body to which the aircraft member is attached prior to obtaining the initial values and the dynamic values.

In another aspect, the method includes that the aircraft member is a flight control member and aligning the flight control member relative to an index plate that is attached to a fuselage prior to obtaining the initial values and the dynamic values.

One aspect is directed to a device to measure an angular deflection of a surface of an aircraft member that has a single pivot axis. The device includes: a gyro sensor configured to sense an orientation of three axes; a processing circuit configured to receive signals from the gyro sensor, the processing circuit configured to obtain an initial value for each axis of the gyro sensor while the gyro sensor is attached to the surface of the aircraft member and obtain dynamic values for each axis of the gyro sensor at a plurality of time instants while the gyro sensor is attached to the aircraft member and the aircraft member is pivoting about the single pivot axis; calculate compensated dynamic values at each of the plurality of time instants for each of the three axes using the initial values; calculate an axis of rotation of the gyro sensor responsive to the compensated dynamic values; and calculate a total deflection angle of the surface of the aircraft member over the plurality of time instants responsive to the compensated dynamic values and the axis of rotation.

In another aspect, the gyro sensor includes a three-axis gyro cluster.

In another aspect, a wireless communication circuit is configured to receive data from a remote source.

In another aspect, the processing circuit is configured to obtain the initial value for each axis while the aircraft member is stationary.

In another aspect, the processing circuit is configured to receive a starting angle and calculate an absolute angle of the surface of the aircraft member.

The features, functions and advantages that have been discussed can be achieved independently in various aspects or may be combined in yet other aspects, further details of which can be seen with reference to the following description and the drawings.

DETAILED DESCRIPTION

Figure 1:
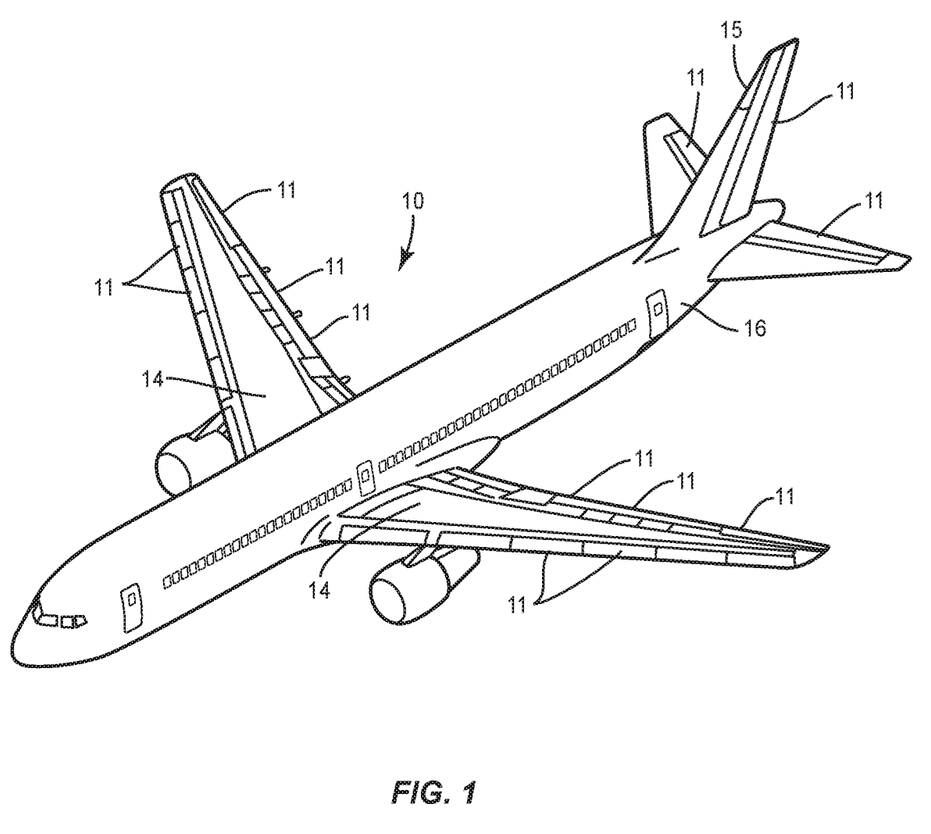
FIG. 1 is perspective view of an aircraft.

An aircraft 10 can include one or more members 11 that each move about a hinge or otherwise have a single-hinged movement. As illustrated in FIG. 1, aircraft members 11 can include but are not limited to a rudder, elevators, ailerons, wing devices, and spoilers. These aircraft members 11 are movably attached to various sections of the aircraft 10 including the wings 14 and tail 15 to change their orientation to control the flight. Other aircraft members 11 with hinged movement include but are not limited to control columns, landing gear, and doors.

Figure 2:
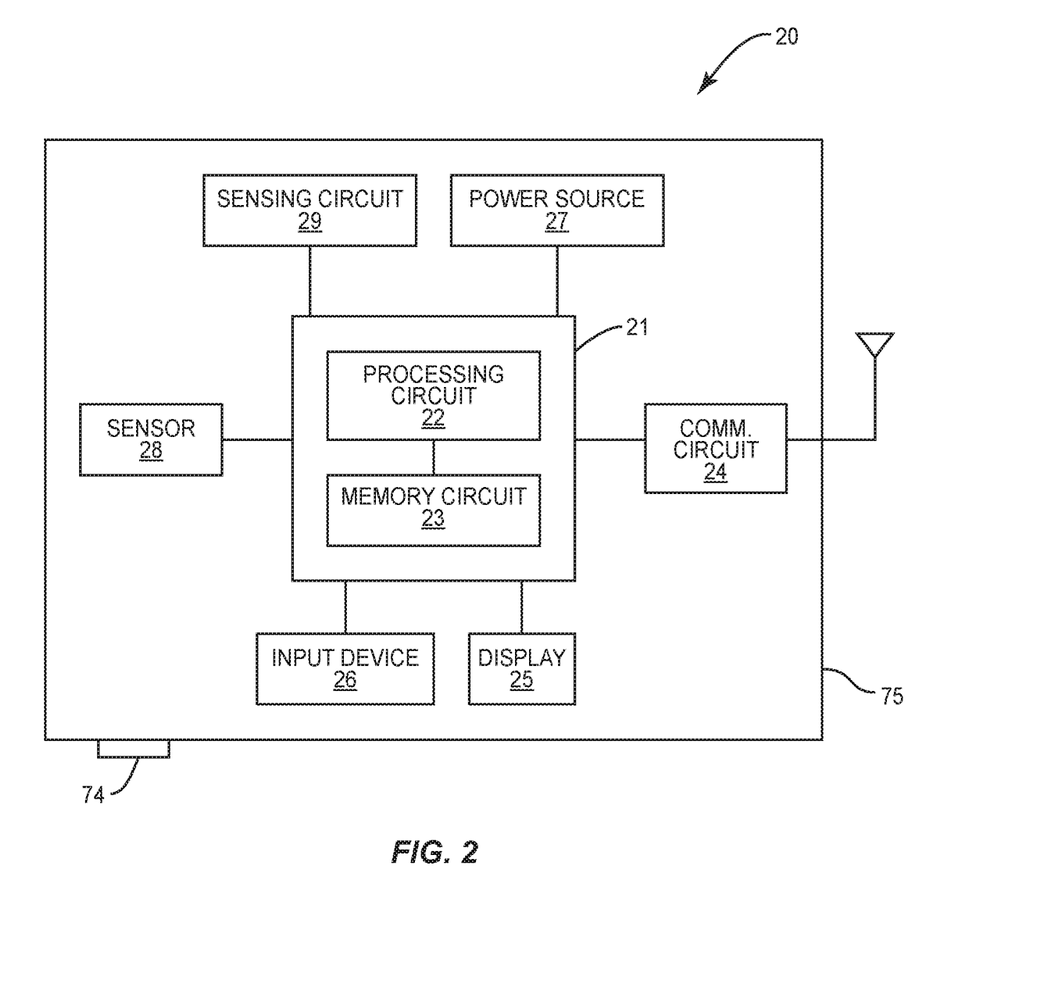
FIG. 2 is schematic view of a multi-axis angle measurement device.

Determining the angular position of the aircraft members 11 can be performed using a multi-axis angle measurement device 20. FIG. 2 illustrates a schematic view of the multi-axis angle measurement device 20 that includes a control unit 21 that includes one or more processing circuits (shown as processing circuit 22) that may include one or more microprocessors, Application Specific Integrated Circuits (ASICs), or the like, configured with appropriate software and/or firmware. A computer readable storage medium (shown as memory circuit 23) stores data and computer readable program code that configures the processing circuit 91 to implement the techniques described above. Memory circuit 23 is a non-transitory computer readable medium, and may include various memory devices such as random access memory, read-only memory, and flash memory.

A communications circuit 24 provides wireless communication with one or more remote devices. The communication circuit 24 can include a radio frequency transmitter and receiver for transmitting and receiving signals through an antenna. The communications circuit 24 can also be configured to provide for connectivity through other communication channels, including but not limited to near field communication (NFC), Bluetooth, WiFi, ARINC 429, and RS232.

A display 25 provides viewable information for the user. The display 25 can comprise any known electronic display, such as a liquid crystal display. Input device 26 can include one or more control devices for the user to enter various commands and make menu selections for menus presented on the display 25. Input devices 26 can include but are not limited to one or more input buttons, keyboard, touch screen input, and joystick.

A power source 27 provides power to the electrical components. The power source 27 can include one or more batteries and/or rechargeable batteries. Power source 27 can include a port for engaging with a power cord for recharging.

The multi-axis angle measurement device 20 includes three separate gyro sensors 28 that are configured to detect angular motion about three mutually orthogonal axes of rotation. The gyro-sensors 28 can include a 3-axis gyro cluster. In one specific design, the gyro sensors 28 are MEMS gyroscopes. A sensing circuit 29 can process signals from the sensor 28, or this circuitry can be included in the processing circuit 22.

A housing 75 extends around and protect the interior electrical components. The housing 75 can be constructed from a rigid material, such as hardened plastic or metal to withstand forces to which it could be exposed. One specific design includes the housing 75 constructed from DELRIN. The housing 75 can be waterproof or water-resistant for use in various environments. The multi-axis angle measurement device 20 is sized and configured to be attached to a flight control surface 11. In one design, the multi-axis angle measurement device 20 is 5.0"×4.25"×1.9". In one design, the multi-axis angle measurement device 20 weighs about two (2) pounds.

One or more connectors 74 provide for attaching the multi-axis measurement device 20 to the aircraft member 11. The connectors 74 are configured to be removably attached without damaging the aircraft member 11. Connectors 74 can include a variety of different configurations, including but not limited to suction device (e.g., suction cup), compressive device (e.g., vice) and mechanical fastener.

The multi-axis angle measurement device 20 measurements the incremental movement of the aircraft member 11 and is not an absolute sensor. The multi-axis angle measurement device 20 establishes an angular position from a relative point. The multi-axis angle measurement device 20 can be used with a rig or known position. In one example, the device 20 is used to calculate the angular position of an elevator 11. An index plate is installed during manufacturing of the aircraft 10 and is riveted to the fuselage 16 in the area where the elevator 11 meets the fuselage 16. Aligning the elevator 11 with the index plate puts the surface at a known angle. At the same time the one or more sensors 28 are zeroed, and angle is then measured from this known position or zero position. In another method, a starting angle is entered into the device 20, such as through the input device 26. This starting angle then provides for the device 20 to calculate an absolute angle relative to the starting position.

Figure 3:
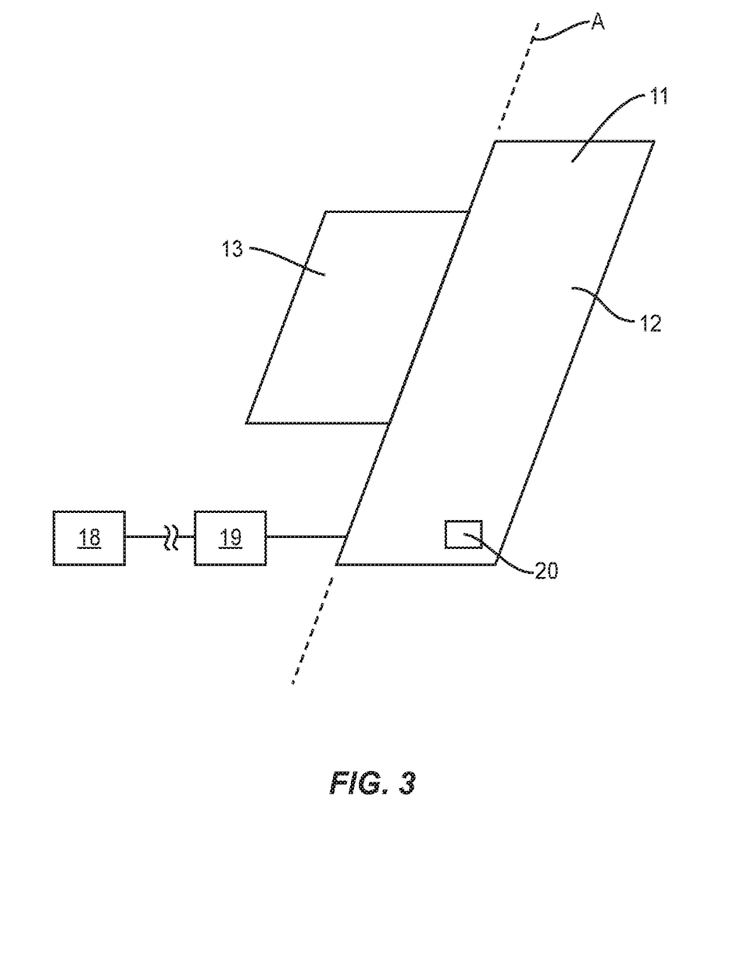
FIG. 3 is schematic diagram of a multi-axis angle measurement device attached to a surface of a aircraft member.

FIG. 3 illustrates a multi-axis angle measurement device 20 attached to a surface 12 of an aircraft member 11. The aircraft member 11 is configured to pivot relative to a static body 13 (e.g., fuselage, wing, tail) about a single pivot axis A. The angular position of the aircraft member 11 is adjusted by a control input 18 that can be located in the cockpit of the aircraft 10. The control input 18 controls the position of one or more pivoting members 19 that adjust the angular position of the aircraft member 11 relative to the static body 13. In one design, the pivoting members 19 are hydraulic actuators controlled through a hydraulic system located within the aircraft 10.

The multi-axis measurement device 20 is used during a ground test operation. During the testing, the aircraft 10 remains rotationally stable with just rotation of the aircraft member 11. In some testing, the static body 13 can have vertical motion, such as a wing 14 that is bouncing vertically during the testing. This vertical motion can be ignored during wing control calibrations.

The multi-axis angle measurement device 20 can be attached to the surface 12 of the aircraft member 11 without regard to the relative position. That is, the multi-axis angle measurement device 20 is simply attached to the surface 12 of the aircraft member 11 in an arbitrary manner. Once attached, the aircraft member 11 is pivoted about the pivot axis A as the multi-axis angle measurement device 20 senses the angular position. The multi-axis angle measurement device 20 is then able to calculate in real time the angular deflection of the surface 12 of the aircraft member 11.

Figure 4:
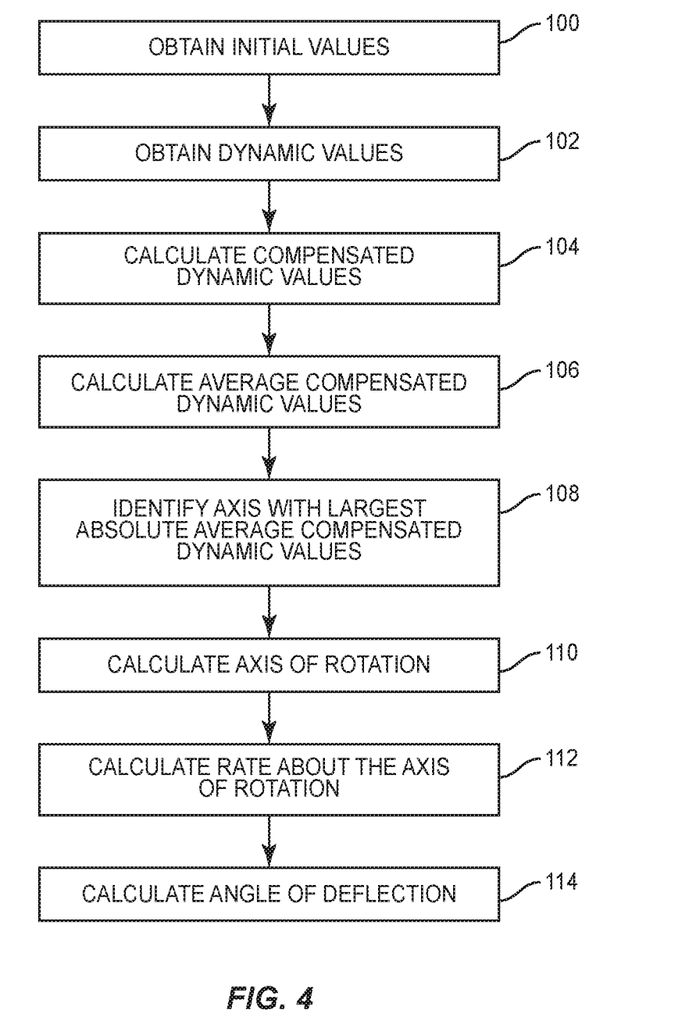
FIG. 4 is flowchart diagram of a method of calculating an angular deflection of a surface of a aircraft member.

FIG. 4 illustrates a method of using the multi-angle calibration device 20 to measure an angular deflection of the surface 12 of the aircraft member 11. The multi-axis angle measurement device 20 is attached to the aircraft member 11 in an arbitrary manner. An initial calibration is performed by the multi-axis angle measurement device 20 (block 100). The initial calibration is a bias compensation of the gyro sensors 28 to remove static drift. In one design, this includes setting the earth rate as a trigger threshold. Output from the gyro sensors 28 that is below this threshold is not used in the integration of rotation, while values above the threshold are determined to be from surface motion and are used in the calculation. The initial calibration occurs when the multi-axis angle measurement device 20 is held static in an operational position for a predetermined time. The measurement period can vary, with one method statically holding the multi-axis angle measurement device 20 for five seconds. Another method statically holds the device 20 for five minutes. The data from the multi-axis angle measurement device 20 is averaged and a bias value for each of the three axes is determined. These results are then be used in subsequent calculations.

n=total number of gyro data samples taken during initial measurement period
$gx\_dps_i$=$i^{th}$ sample of x-gyro
$gy\_dps_i$=$i^{th}$ sample of y-gyro
$gz\_dps_i$=$i^{th}$ sample of z-gyro $$gxBias\_dps = \frac{\sum_{i=1}^{n} gx\_dps_i}{n}$$

$$gyBias\_dps = \frac{\sum_{i=1}^{n} gy\_dps_i}{n}$$

$$gzBias\_dps = \frac{\sum_{i=1}^{n} gz\_dps_i}{n}$$

Once the initial calibration is completed, dynamic values are obtained for each of the three axes over a period of time (block 102). During the dynamic measurement period, dynamic measurements for each axis are taken at time instants throughout the measurement period. This can include a predetermined number of measurements, or can include measurements taken at a predetermined frequency during a period of time.

m=total number of gyro data samples taken during dynamic measurement period
$gx\_dps_i$=$i^{th}$ sample of x-gyro
$gy\_dps_i$=$i^{th}$ sample of y-gyro
$gz\_dps_i$=$i^{th}$ sample of z-gyro After the initial and dynamic values are obtained, compensated dynamic values are calculated for each of the three axes for each of the time instants (block 104). In addition, a magnitude of the compensated dynamic values is calculated for each time instant. These compensated values are calculated as follows:

$$gxComp\_dps_i = gx\_dps_i - gxBias\_dps$$

$$gyComp\_dps_i = gy\_dps_i - gyBias\_dps$$

$$gzComp\_dps_i = gz\_dps_i - gzBias\_dps$$

$$gMagComp\_dps_i = \sqrt{gxComp\_dps^2_i + gyComp\_dps^2_i + gzComp\_dps^2_i}$$

The method calculates an average compensated dynamic value for each of the three axes (block 106). This also includes calculating a magnitude average compensated dynamic value for each time instant.

$$g(x)Ave\_dps = \frac{\sum_{i=1}^{m} gxComp\_dps_i}{m}$$

$$g(y)Ave\_dps = \frac{\sum_{i=1}^{m} gyComp\_dps_i}{m}$$

$$g(z)Ave\_dps = \frac{\sum_{i=1}^{m} gzComp\_dps_i}{m}$$

$$gMagAve\_dps = \frac{\sum_{i=1}^{m} gMagComp\_dps_i}{m}$$

The method next identifies the axis with the largest absolute value of the average compensated dynamic value (block 108). This is the sign of the maximum axis (signMax).

A normalized transformation from the axis of the device 20 to the axis of rotation is calculated using the sign of the maximum axis (signMax) and the average compensated dynamic values (block 110).

$$Cxa_{imu2aor} = signMax \cdot g(x)Ave\_dps/gMagAve\_dps$$

$$Cya_{imu2aor} = signMax \cdot g(y)Ave\_dps/gMagAve\_dps$$

$$Cza_{imu2aor} = signMax \cdot g(z)Ave\_dps/gMagAve\_dps$$

$$mag = \sqrt{Cxa^2_{imu2aor} + Cya^2_{imu2aor} + Cza^2_{imu2aor}}$$

$$C'xa_{imu2aor} = Cxa_{imu2aor}/mag$$

$$C'ya_{imu2aor} = Cya_{imu2aor}/mag$$

$$C'za_{imu2aor} = Cza_{imu2aor}/mag$$

Using the axis of rotation and the compensated dynamic values, the method calculates a rate about the axis of rotation (block 112). The rate is calculated for the data samples taken at each of the time instants (t).

m=total number of gyro data samples taken during the dynamic measurement period for each set of data samples $$rate\_dps_i = C'xa_{imu2aor} \cdot gxComp\_dps_i + C'ya_{imu2aor} \cdot gyComp\_dps_i + C'dza_{imu2aor} \cdot gzComp\_dps_i$$

Finally, the rate is integrated about the axis of rotation at the time instants to calculate the angle of deflection of the surface of the aircraft member 11 (block 114).

m=total number of gyro data samples taken during dynamic measurement period

δθ is the measured aerodynamic surface deflection angle

Since the relative angle at which the multi-axis angle measurement device 20 is positioned on the flight control surface 12 is unknown, δθ is initially set to zero.

Loop i=2 through m $$\delta\theta = \delta\theta + (rate\_dps_i + rate\_dps_{i-1})/2 \cdot (t_i - t_{i-1})$$

In one design, the angular starting position of the surface 12 of the aircraft member 11 is known. This angle is input into the device 20 through the input device 26 or otherwise signaled to the device 20 through the communication circuit 24. This angle is then used as the beginning angle when calculating the angle of deflection. The starting position can be static or dynamic.

Figure 5:
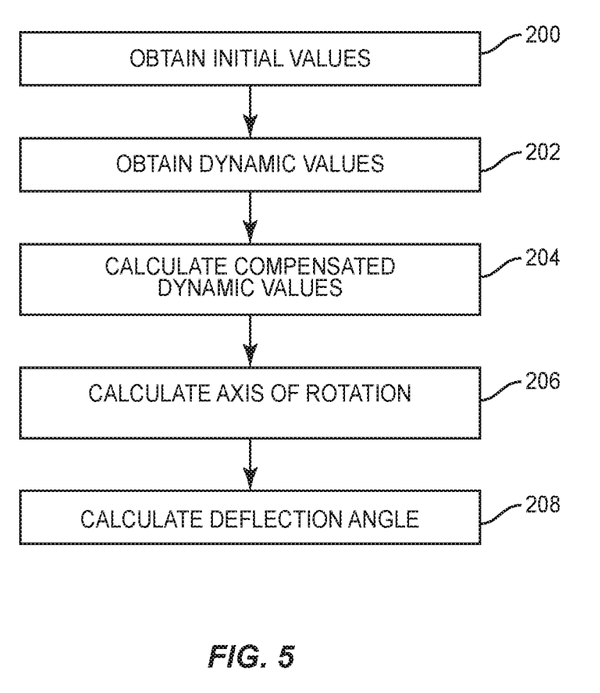
FIG. 5 is flowchart diagram of a method of calculating an angular deflection of a surface of a aircraft member.

FIG. 5 illustrates a method of using the multi-axis angle measurement device 20 to determine the angular deflection of the surface of the aircraft member 11. The method includes obtaining values from the multi-axis angle measurement device 20 for each of the axes while the aircraft member 11 is stationary (block 200) and also while the aircraft member 11 is moving (block 202). Compensated dynamic values are calculated at each of the time instants for each of the three axes using the initial values (block 204). The axis of rotation is calculated responsive to the compensated dynamic values (block 206). Finally, the total deflection angle of the surface of the aircraft member 11 is calculated responsive to the compensated dynamic values and the axis of rotation (block 208).

The initial values are static values that are taken while the device 20 is held stationary. The amount of time that the device 20 is held stationary to obtain the initial values can vary.

The method can be used to determine the angular deflection of a surface 12 of an aircraft member 11 as disclosed above. The aircraft member 11 can be used on a variety of different aircraft, including a commercial aircraft as illustrated in FIG. 1 that includes rows of seats each configured to accommodate a passenger. The method can also be used to determine the angular position of surfaces on other vehicles including but are not limited to manned aircraft, unmanned aircraft, manned spacecraft, unmanned spacecraft, manned rotorcraft, unmanned rotorcraft, satellites, rockets, missiles, manned terrestrial aircraft, unmanned terrestrial aircraft, manned surface water borne aircraft, unmanned surface water borne aircraft, manned sub-surface water borne aircraft, unmanned sub-surface water borne aircraft, and combinations thereof.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of measuring an angular deflection of an aircraft member that has a single pivot axis, the method comprising:
   obtaining an initial value for each of a first axis, a second axis, and a third axis of a multi-axis angle measurement device while the multi-axis angle measurement device is attached to the aircraft member;
   obtaining a dynamic value for each of the axes for each of a plurality of time instants while the multi-axis angle measurement device is attached to the aircraft member and the aircraft member is moving about the single pivot axis;
   calculating a compensated dynamic value for each of the axes for each of the plurality of time instants using the initial values;
   calculating an average compensated dynamic value for each of the three axes;
   identifying a maximum axis as one of the first, second, and third axes having a largest absolute value of the average compensated dynamic value;
   calculating a transformation from the first, second, and third axes of the multi-axis angle measurement device to the pivot axis;
   calculating a rate about the pivot axis for each of the plurality of time instants using the corresponding compensated dynamic values; and
   integrating the rates about the pivot axis over the plurality of time instants to calculate an angle of deflection of the aircraft member.

2. The method of claim 1, wherein calculating compensated dynamic values for each of the axes comprises subtracting, for each of the plurality of time instants, the corresponding initial value from each of the dynamic values.

3. The method of claim 1, further comprising obtaining the initial values for each of the first axis, the second axis, and the third axis occurs while the aircraft member is stationary.

4. The method of claim 1, further comprising wirelessly transmitting calculations to a remote source.

5. The method of claim 1, further comprising receiving an initial starting angle of the aircraft member and calculating an absolute angular position of the aircraft member.

6. The method of claim 5, further comprising aligning the aircraft member at a known angle relative to a support body to which the aircraft member is attached prior to obtaining the initial values and the dynamic values.

7. The method of claim 6, further comprising the aircraft member being an flight control member and aligning the flight control member relative to an index plate that is attached to a fuselage prior to obtaining the initial values and the dynamic values.

8. A method of measuring an angular deflection of a surface of an aircraft member that has a single pivot axis, the method comprising:
   obtaining an initial value for each axis of a gyro sensor having three axes while the gyro sensor is attached to the surface of the aircraft member;
   obtaining dynamic values for each axis of the gyro sensor at a plurality of time instants while the gyro sensor is attached to the aircraft member and the aircraft member is pivoting about the single pivot axis;
   calculating compensated dynamic values at each of the plurality of time instants for each of the three axes using the initial values;
   calculating an axis of rotation of the gyro sensor responsive to the compensated dynamic values; and
   calculating a total deflection angle of the surface of the aircraft member over the plurality of instants responsive to the compensated dynamic values and the axis of rotation.

9. The method of claim 8, wherein calculating the compensated dynamic values at the plurality of time instants for each of the three axes comprises subtracting the corresponding static value from each of the corresponding dynamic values at each of the plurality of instants.

10. The method of claim 8, wherein calculating the axis of rotation comprises:
    calculating, for each of the three axes, an average dynamic value for the plurality of time instants;
    identifying a maximum axis as the axis having a largest absolute value of the average dynamic value; and
    calculating the axis of rotation of the gyro sensor responsive to the compensated dynamic values and the maximum axis.

11. The method of claim 8, wherein calculating the total deflection angle comprises:
    calculating a rate about the axis of rotation for each of the plurality of time instants using the corresponding compensated dynamic values; and
    integrating the rates about the axis of rotation over the plurality of time instant to calculate the total deflection angle.

12. The method of claim 8, further comprising obtaining the initial value for each axis of the gyro sensor while the aircraft member is stationary.

13. The method of claim 8, further comprising receiving a starting angle of the surface of the aircraft member and calculating an absolute angle of the surface of the aircraft member.

14. The method of claim 8, further comprising aligning the aircraft member at a known angle relative to a support body to which the aircraft member is attached prior to obtaining the initial values and the dynamic values.

15. The method of claim 14, further comprising the aircraft member being a flight control member and aligning the flight control member relative to an index plate that is attached to a fuselage prior to obtaining the initial values and the dynamic values.

16. A device to measure an angular deflection of a surface of an aircraft member that has a single pivot axis, the device comprising:
    a gyro sensor that senses an orientation of three axes;
    a processing circuit configured to receive signals from the gyro sensor, the processing circuit configured to:
       obtain an initial value for each axis of the gyro sensor while the gyro sensor is attached to the surface of the aircraft member;
       obtain dynamic values for each axis of the gyro sensor at a plurality of time instants while the gyro sensor is attached to the aircraft member and the aircraft member is pivoting about the single pivot axis;
       calculate compensated dynamic values at each of the plurality of time instants for each of the three axes using the initial values;
       calculate an axis of rotation of the gyro sensor responsive to the compensated dynamic values; and
       calculate a total deflection angle of the surface of the aircraft member over the plurality of time instants responsive to the compensated dynamic values and the axis of rotation.

17. The device of claim 16, wherein the gyro sensor comprises a three-axis gyro cluster.

18. The device of claim 16, further comprising a wireless communication circuit configured to receive data from a remote source.

19. The device of claim 16, wherein the processing circuit is configured to obtain the initial value for each axis while the aircraft member is stationary.

20. The device of claim 16, wherein the processing circuit is configured to receive a starting angle and calculate an absolute angle of the surface of the aircraft member.

* * * * *